United States Patent [19]
Wittkopp

[11] Patent Number: 5,182,976
[45] Date of Patent: Feb. 2, 1993

[54] SPRING BEAMED SHOCK ABSORBING CIRCULAR SAW BLADE BODY

[75] Inventor: Connell A. Wittkopp, Columbus, Ohio

[73] Assignee: The Peerless Saw Company, Groveport, Ohio

[21] Appl. No.: 929,991

[22] Filed: Nov. 12, 1986

Related U.S. Application Data

[63] Continuation-in-part of Ser. No. 676,540, Nov. 30, 1984, abandoned, and a continuation-in-part of Ser. No. 531,222, Sep. 9, 1983, abandoned.

[51] Int. Cl.⁵ .................... B27B 33/08; B23D 61/02
[52] U.S. Cl. .................................... 83/835; 83/676
[58] Field of Search .................. 83/835, 837–850, 83/676

[56] References Cited

U.S. PATENT DOCUMENTS 4,574,676  3/1986  Jansen-Herfeld .................. 83/835

FOREIGN PATENT DOCUMENTS 20025    3/1915   Denmark .......................... 83/837
8505064 11/1985   PCT Int'l Appl. ................. 83/651
905075   2/1982   U.S.S.R. ........................... 83/835

OTHER PUBLICATIONS

"Stammblätter mit Spannungsausgleich und Geräuschminderung für Diament-Trennscheiben", H. Mummenhoff, IDR-Industrie Diamenten Rundshall, 17, Jan./Mar. 1983, Rheindruck GmbH, Düsseldorf.

Primary Examiner—Hien H. Phan
Attorney, Agent, or Firm—Porter Wright Morris & Arthur

[57] ABSTRACT

A body for a circular saw blade is a saw blade having intrinsic spring beamed segments in the annular sections of the body between the drive collar and outer cutting rim in which a slot system is provided as a means to limit deformation of the blade when an inconsistency in the density of media to be cut is encountered in blade operation. The slot system provides a means to dissipate stress so that the yield strength of the blade material is not exceeded and blade deformation is prevented.

5 Claims, 2 Drawing Sheets

SPRING BEAMED SHOCK ABSORBING CIRCULAR SAW BLADE BODY

RELATED APPLICATIONS

This application is a continuation-in-part of my prior application for Letters Patent Ser. No. 676,540 filed Nov. 30, 1984, now abandoned, and is also related to and is a continuation-in-part of my prior application for Letters Patent, Ser. No. 531,222, filed Sep. 9, 1983, now abandoned.

FIELD OF THE INVENTION

This invention relates to an improved circular saw blade and/or blank. The body of the blade or blank has intrinsic springed beam segments that enhance the resistance of the saw blade body to stress failure while the saw is in use.

BACKGROUND OF THE INVENTION

In a theoretical model, a rotating circular saw blade may be compared to a rotating disk divided into annular segments including (1) a circumferential cutting edge or rim (2) connected by a "middle" radially extended segment to (3) a "central" drive collar that is connected to a power source at the center blade "eye." It is evident that the centrifugal force of a powered, rotating blade, at any annular ring at a given radius from the blade center, is proportional to the radial distance of the ring from the driven blade center.

The cutting edge of one type of metal saw blade contains cutting "teeth" separated by "gulletts" spaced about the peripheral circumference of the blade in a predetermined pattern. The teeth may be of a material different from the metal blade disk; for example, carbide teeth are frequently employed. Or in some blades, such as diamond segment saws used for cutting masonry and other hard materials, the blade rim or circumference includes an abrasive cutting material (e.g., diamond powder) intrinsically bonded to the saw body surface at its outer circumferential section.

As the blade is in use while cutting a material, the circumferential rim of the blade, the blade teeth and/or discrete sections of the blade are subjected to various stresses, which in turn are distributed as a force or combination of forces through the blade disk.

In wood cutting, for example, a sudden inconsistency encountered in the density of the wood cut, such as a knot, may result in a "shock" force transmitted in the blade which results in a tooth break, a separation of a carbide tooth from the blade body, or a crack in the blade body propagating from the blade gullett. Such occurrences may lead to a blade stress failure.

OBJECTS OF THE INVENTION

It is an object of the invention to provide a circular saw blade having an enhanced resistance to blade stress failure caused by shock effects resulting from inconsistencies encountered by the blade in the cutting material. It is a further object to provide a saw blade having an intrinsic resilience, or cushioning effect, in the central radial section of the blade between the rim (the outer blade circumference) and the drive collar, to sporadic and/or regular inconsistencies encountered by the blade in the cutting operation of a driven blade.

Correlatively, it is an object to provide a structural body for a saw blade or saw blank in which a springed beam connection between the drive collar and cutting rim is intrinsically provided by a shaped configuration that is cut into the blade or blank body to form the springed support.

Having an intrinsic resilience or shock-cushioning feature, circular saw blades including a springed body of the invention have a reduced susceptibility to destructive effects which occur when the blade encounters a shock-producing inconsistency in the cut media. Thus, shock effects on the blade tooth and gullett, which conventionally lead to blade stress failure, are reduced.

SUMMARY OF THE INVENTION

A springed beam configuration which provides intrinsically divided segments formed by specifically shaped cut out sections in the annular section of the blade between the drive collar and the cutting rim of the blade is the means by which these desired objects are accomplished.

DESCRIPTION OF THE PREFERRED EMBODIMENT

Figure 1B:
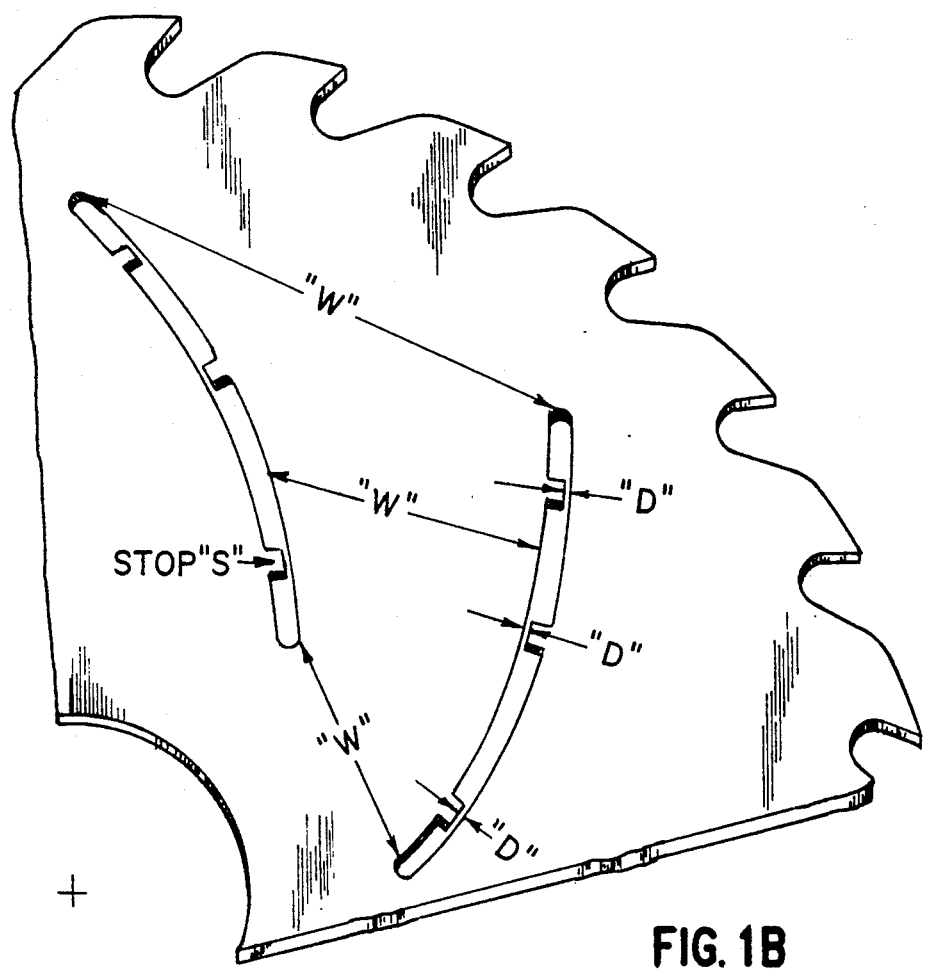
FIG. 1B shows a detail of alternate "spring" and "stop" segments formed by intrinsically cut configurations in a blade body.

In its most general description, the invention is a saw blade body consisting of a series of essentially radial beam segments that are intrinsically formed in the central annular section of a disc blade body between the drive collar and cutting circumference. The radial segments are formed by cutting material from the central section of the blade body to produce connecting beams which extend from the blade drive collar to the cutting circumference. The beams provide a springed support for the blade rim which cushions a spinning blade from shock effects induced in the blade when a blade tooth [or teeth], or more generally the outer blade periphery at its circumference, encounters an inconsistency in the density of the material to be cut or is otherwise subjected to stress while in use.

The springed beam support contrasts with a conventional saw blade. In the latter, there is little shock resistance upon such an occurrence and a tooth break or crack in the saw body may result. The intrinsic springed support beam configuration of the present invention cushions, absorbs, or dissipates such shock forces encountered by the blade. The springed beam is explained more fully below.

In an explanation of the principle of the invention, it is considered that a force is created in a driven circular blade or saw in the area between the teeth or cutting edge and the blade eye by reason of the drive force applied to the eye at the drive collar and the load encountered by the cutting teeth. In a conventional annular saw, there is little shock resistance in the blade to absorb a force between the load encountered by the teeth and the drive force applied at the eye. The invention provides a spring-tempered action in a blade to absorb such a load. Conventionally, when a sudden load is encountered by the blade, or when a persistent load is maintained, and the tensile strength of the blade is exceeded, blade failure, such as a tooth break or a crack propagating from a tooth gullett occurs. If in a conventional blade, the stress is such that the tensile strength of the blade material is not exceeded, but is in excess of the yield strength of the material from which the blade is formed, the blade will take a set and become deformed. In a typical blade formed from a metal, steel or alloy, these occurrences depend upon metallurgical parameters.

In the invention, cut out segments are provided in the blade to form a plurality of springed beams that act as a stress or shock absorber between the drive collar and cutting edge. The segments are provided in such a configuration, shape and number that when stress is encountered at the blade rim, the blade body will inherently provide a degree of resilience such that the yield strength of the blade material will not be exceeded. Thus, the likelihood of blade deformation or blade cracking is reduced. The number of cut out segments, and the corresponding springed beams thereby produced, and their shape and configuration in the blade thus depends on the blade size, blade material, and conditions of use of the blade, such as revolutions per minute, horsepower input and the like. These are parameters associated with interrelated physical phenomena and depend upon complex variables and are determined for individual applications. The amount of flexion or spring permitted in a given blade body formed in accordance with the invention in such circumstances is calculated upon application. For example, with reference to a blade body of the type shown in FIG. 1A, the distance "W" is a measure of the width of an individual spring beam section between adjacent cut outs.

Figure 1A:
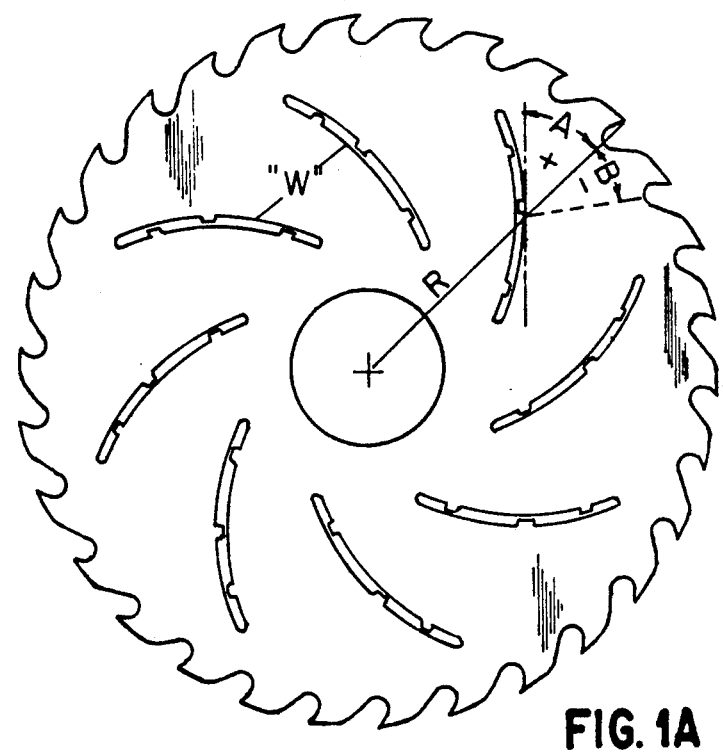
FIG. 1A is a plan view showing a "stopped" springed blade body of the invention.

With reference to the detail of FIG. 1B, it is illustrated that the spring effect created by the beams can itself be tempered: the width W of the bending beam formed combined with the parameters of the physical Properties of the saw blade material will determine the limit of physical deformation (or flexure) allowed so that the yield strength of the blade material is not exceeded.

In FIG. 1B, "stops" indicated as "S" in the cut out section are shown protruding within the curvature of the slot and produce the stop having the narrower dimension "D" between adjacent sides within a wider cut out. If a predetermined allowed deformation for the blade is permitted before the yield strength of the blade metal body is exceeded and the average slope angle for the beams is "A," the given distance "D" and the location of stops "S" can be determined by a consideration of forces likely to be encountered by a power driven blade in a given operating condition. When "stops" are provided in the cut out sections, for example, as shown in the blade body of FIG. 1B, a beam forming cut out segment is further divided by sections which define a "nib" as a mechanical stop for the spring effect.

Figure 2B:
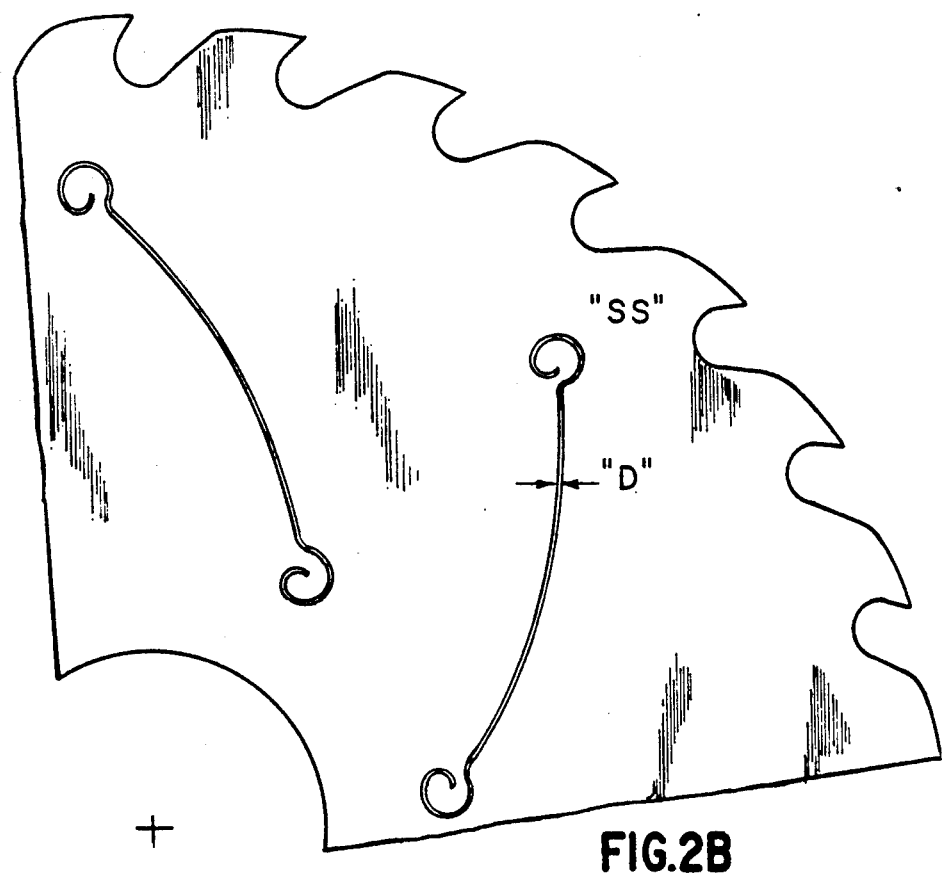
FIG. 2A and FIG. 2B are respectively a plan and detail view of an alternate embodiment.
Figure 2A:
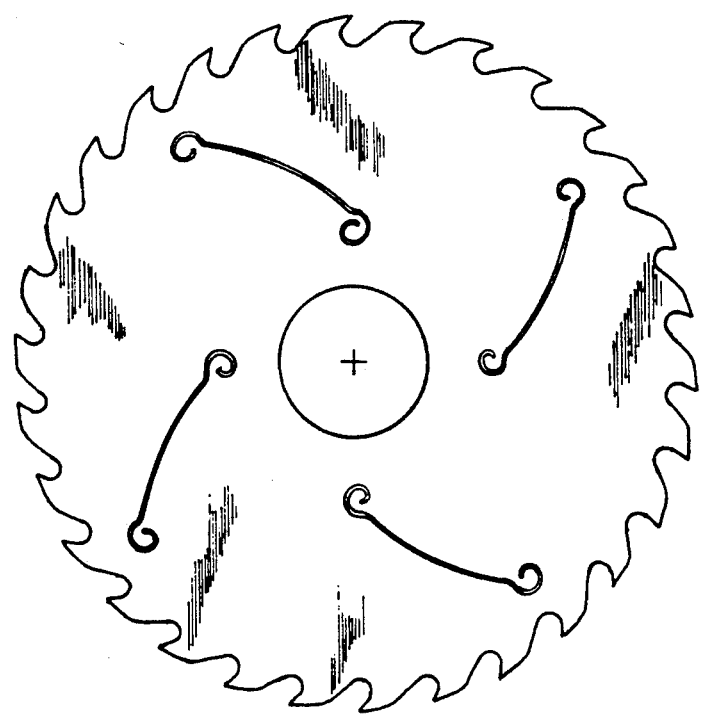

FIGS. 2A and 2B illustrate another type of slot or cut out used to create a series of spring beams. In this example the width of the slot is uniform and equal to the distance "D." When such a narrow slot is used to create the beams, the end of the slot is terminated with a curvilinear, stress stop such as indicated by "SS" in the detail of FIG. 2B. The curvilinear stress stop keeps the slot that creates the beams from itself becoming a cause of failure. Such forms of curvilinear stress stops are described in my co-pending application for Letters Patent, Ser. No. 531,222 filed Sep. 9, 1983.

Thus as shown in the examples, an individual circular saw blade body may be separated into springed beam forming segments to provide a predetermined shock absorbing character for each segment. Each such beam segment itself may in turn be "fine tuned" by manipulating the configuration of the cut out to produce the desired mechanical cushioning effect appropriate to a predetermined saw material or cutting operation. In summary, a mechanical stop is provided to insure that in any given segment of the springed blade beam, the yield strength of the blade material is not exceeded. While circular saw blades have been referred to, it is a practice in the industry that blanks for blades (without a finished cutting edge) are sold as commercial items. Thus, it is not intended to exclude such blanks from the scope of invention claimed; and in this specification and the following claims a blade "body" is referred to as inclusive both of finished blades and blanks.

What is claimed is:

1. In a circular saw blade body having integral sections comprising a central drive collar and a peripheral circumferential cutting edge for cutting a material, connected by a middle annular section, and a plurality of narrow curved extended slots cut through the saw blade body between the collar and the cutting edge, the improvement comprising:
   a nib protruding from one internal side of a curved slot a predetermined distance across the width of the slot towards the facing internal side of the curved slot to provide a stop means, upon the sudden absorption of a load by the blade, for limiting the blade's physicial deformation to a predetermined degree such that the yield strength of the metal material forming the blade body is not exceed when the blade encounters the sudden load, said nib comprising an element intrinsicially formed from the metal material of the saw blade body and having a small width in comparison to the overall length of the side of the slot from which it protrudes.

2. The saw blade body of claim 1 including a plurality of nibs protruding within an extended slot.

3. The saw blade body of claim 2 in which at least one of the plurality of nibs protruding within the curvature of the extended slot protrudes in a direction from a side of the curved slot opposite the side of the slot from which another nib protrudes.

4. The saw blade body of claim 3 in which the positions of the nibs alternate from side to side with respect to the facing sides of the curved extended slot from which the nibs protrude.

5. The saw blade body of claim 2 or claim 3 or claim 4 in which the curved slot is sloped at an angle with respect to the radius of the body.

* * * * *